(12) United States Patent
Ishikawa et al.

(10) Patent No.: US 12,196,334 B2
(45) Date of Patent: Jan. 14, 2025

(54) CHECK VALVE UNIT

(71) Applicant: TSUBAKIMOTO CHAIN CO., Osaka (JP)

(72) Inventors: Yuichiro Ishikawa, Osaka (JP); Shogo Matsushita, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 38 days.

(21) Appl. No.: 18/213,357

(22) Filed: Jun. 23, 2023

(65) Prior Publication Data

US 2024/0011572 A1    Jan. 11, 2024

(30) Foreign Application Priority Data

Jul. 7, 2022   (JP) ................................ 2022-109730

(51) Int. Cl.
*F16K 27/02* (2006.01)
*F16K 15/04* (2006.01)

(52) U.S. Cl.
CPC ........ *F16K 27/0209* (2013.01); *F16K 15/044* (2013.01); *F16K 27/0245* (2013.01)

(58) Field of Classification Search
CPC ........................... F16K 15/044; F16K 27/0245
See application file for complete search history.

(56) References Cited

U.S. PATENT DOCUMENTS

| | | | | |
|---|---|---|---|---|
| 5,967,180 A | * | 10/1999 | Yates, III | ............. F16K 15/044 137/533.19 |
| 10,260,603 B2 | * | 4/2019 | Kurematsu | ........... F16H 7/0848 |
| 11,143,100 B2 | * | 10/2021 | Iwasaki | ................ F16H 7/0829 |

FOREIGN PATENT DOCUMENTS

| | | |
|---|---|---|
| JP | 2019-113178 A | 7/2019 |
| JP | 2019-157974 A | 9/2019 |

* cited by examiner

*Primary Examiner* — Hailey K. Do
(74) *Attorney, Agent, or Firm* — WHDA, LLP

(57) ABSTRACT

To provide a simple-structured check valve unit that allows for retention of a seat relief in an attachment part of a plunger bore, facilitates production without increasing components, and prevents deformation of the plunger. The check valve unit includes the seat relief and a cap member. The plunger has an outlet relief hole in the attachment part for communication between the inside and outside of the plunger. The cap member includes a cap top, an oil flow portion, and a skirt wall. The skirt wall includes a plurality of outwardly raised contact surfaces and a plurality of inwardly raised contact surfaces. The circumscribed circle of the outwardly raised contact surfaces has a larger radius than the inside radius of the attachment part, and the inscribed circle of the inwardly raised contact surfaces has a smaller radius than the outside radius of an engaging part of the seat relief.

8 Claims, 7 Drawing Sheets

A-A' CROSS SECTION

A-A' CROSS SECTION

B-B' CROSS SECTION

CHECK VALVE UNIT

BACKGROUND OF THE INVENTION

1. Field of the Invention

The present invention relates to a check valve unit inside the plunger of a high-pressure relief valve of a tensioner.

2. Description of the Related Art

A tensioner that has a check valve unit inside the plunger is known, as described in Japanese Patent Application Publication No. 2019-113178.

The check valve unit (relief valve unit 151) of the tensioner described in Japanese Patent Application Publication No. 2019-113178 is inserted into an attachment part in the far end of the plunger bore 122. The check valve unit (relief valve unit 151) includes a seat relief (seat member 152), which contains a check valve (a valve ball 153, a spring 160, and a stopper member 155), and a cap member 156 that fits onto an engaging part (engaging recess 174) of the seat relief (seat member 152) at one end in the direction in which the seat relief is inserted into the plunger bore 122.

In the check valve unit (relief valve unit 151) of this tensioner, the outermost diameter across the seat relief (seat member 152) has substantially the same diameter as the inside diameter of the plunger bore 122. The seat relief (seat member 152) is press-fit into the plunger bore 122 and secured to the attachment part.

Japanese Patent Application Publication No. 2019-157974 describes another tensioner that has a check valve unit inside the plunger.

The check valve unit (relief valve unit 151) of the tensioner described in Japanese Patent Application Publication No. 2019-157974 is inserted into an attachment part in the far end of the plunger bore 122. The check valve unit (relief valve unit 151) includes a seat relief (seat member 152), which contains a check valve, and a cap member 156 that fits onto an engaging part of the seat relief (seat member 152) at one end in the direction in which the seat relief is inserted into the plunger bore 122.

This tensioner further includes a resin-made retention member 180 that secures the check valve unit (relief valve unit 151) to the attachment part. Thus, there is no need for precise machining of the seat relief (seat member 152) and the plunger bore 122 to achieve an outermost diameter and inside diameter suitable for press-fitting the seat relief (seat member 152), resulting in reduced machining costs.

The retention member 180 made of resin can be press-fit into the plunger bore 122 without causing deformation in the plunger 120, allowing the dimensional precision of the plunger 120 to be maintained.

SUMMARY OF THE INVENTION

The check valve units of the tensioners known from the patent documents mentioned above still have some scope of improvement.

Namely, the check valve unit of the tensioner known from Japanese Patent Application Publication No. 2019-113178 had the drawback of increasing machining costs due to the structure in which the seat relief is press-fit into the plunger bore and secured to the attachment part, which requires precise machining of the outside diameter of the seat relief and the inside diameter of the plunger bore.

If the plunger deforms during the press-fitting of the seat relief into the plunger bore, an additional machining process would be necessary to ensure the dimensional precision of the plunger. This would further increase the machining cost.

The check valve unit of the tensioner known from Japanese Patent Application Publication No. 2019-157974 had the drawback of increasing production costs due to the increased number of components required, specifically the need for a separate retention member for securing the seat relief or cap member.

The press-fitting process had to be carried out carefully due to the possibility of abrasion on the resin retention member during the press-fitting into the plunger bore.

The present invention solves these problems and aims at providing a simple-structured check valve unit that allows for reliable retention of the seat relief in an attachment part of the plunger bore, facilitates production without involving an increase in the number of components, and prevents plunger deformation.

The present invention achieves the above object by providing a check valve unit, to be installed in a plunger of a high-pressure relief valve of a tensioner, including: a seat relief that contains a check valve and is inserted into a plunger bore formed in the plunger; and a cap member fitted onto an engaging part of the seat relief at one end thereof in a direction in which the seat relief is inserted into the plunger bore. The plunger includes an outlet relief hole in an attachment part of the plunger bore for communication between inside and outside of the plunger. The cap member includes a flat cap top, an oil flow portion that is a hole extending through the cap top, and a skirt wall that extends down from the cap top. The skirt wall includes a plurality of outwardly raised contact surfaces protruding radially outwards and a plurality of inwardly raised contact surfaces protruding radially inwards. The plurality of outwardly raised contact surfaces have a circumscribed circle with a radius that is larger than an inside radius of the attachment part of the plunger bore before the check valve unit is installed in the plunger. The plurality of inwardly raised contact surfaces have an inscribed circle with a radius that is smaller than an outside radius of the engaging part before the cap member is fitted onto the engaging part.

In the check valve unit according to claim 1, the skirt wall of the cap member includes a plurality of outwardly raised contact surfaces protruding radially outwards and a plurality of inwardly raised contact surfaces protruding radially inwards. The circumscribed circle of the plurality of outwardly raised contact surfaces has a radius that is larger than the inside radius of the attachment part of the plunger bore before the check valve unit is installed in the plunger. The inscribed circle of the plurality of inwardly raised contact surfaces has a radius that is smaller than the outside radius of the engaging part before the cap member is fitted onto the engaging part. The check valve unit is inserted into the far end of the attachment part of the plunger bore, with the cap member fitted on the engaging part. The cap top makes tight contact with the end face of the plunger bore and closes the space between the cap top and the end face of the plunger bore. The flexible and elastic deformation of the skirt wall allows tight contact between the attachment part and the outwardly raised contact surfaces, as well as produces a resilient force, which causes the engaging part and the inwardly raised contact surfaces to make tight contact with each other. Thus, the check valve unit can be firmly fastened to the attachment part.

It is therefore not necessary to design and machine the seat relief with a precise outside diameter suited to the press-fitting into the plunger bore. This simplifies production and reduces production costs.

According to the configuration set forth in claim 2, the skirt wall further includes a plurality of intermediate raised surfaces protruding radially outwards, and the plurality of intermediate raised surfaces have a circumscribed circle with a radius that is smaller than the radius of the circumscribed circle of the plurality of outwardly raised contact surfaces. This enhances the resilient force generated by the elastic deformation of the skirt wall when the check valve unit is inserted into the attachment part, allowing the check valve unit to be fastened to the attachment part even more firmly.

According to the configuration set forth in claim 3, the cap member is made of a metal material, so that the cap member is less prone to degradation in comparison to resin components, and can keep the force that fastens the check valve unit to the attachment part for a long time.

According to the configuration set forth in claim 4, the seat relief has an outermost diameter that is smaller than an inside diameter of the plunger bore, so that contact between the plunger bore and the seat relief is kept minimal when securing the check valve unit to the attachment part, and thus deformation of the plunger is prevented.

Adjusting the clearance between the seat relief and the plunger bore allows adjustment of the amount of oil flow when the check valve is closed.

According to the configuration set forth in claim 5, the check valve includes a valve ball and a relief valve spring that biases the valve ball. The cap member includes a rod-like stopper extending down from the cap top, the stopper being configured to pass through the relief valve spring. The stopper passed through the relief valve spring can prevent displacement of the center axis to ensure that the spring presses the valve ball from a correct position in a correct direction.

According to the configuration set forth in claim 6, the cap top is formed with a cap communication groove that communicates an outer circumferential portion of the cap top with the oil flow portion. The cap communication groove can provide an oil flow path between the cap top and the end face of the plunger bore. The number or size of the cap communication grooves may be tailored to adjust the amount of oil flow when the check valve is closed.

According to the configuration set forth in claim 7, the seat relief is formed with a seat relief communication groove that communicates an outer circumferential portion of an end face that makes tight contact with the cap top with the oil flow portion of the cap top. The seat relief communication groove can provide an oil flow path between the cap top and the end face making tight contact therewith. The number or size of the seat relief communication grooves may be tailored to adjust the amount of oil flow when the check valve is closed.

DESCRIPTION OF THE PREFERRED EMBODIMENT

A check valve unit 100 according to one embodiment of the present invention will be hereinafter described with reference to the drawings.

Figure 1:
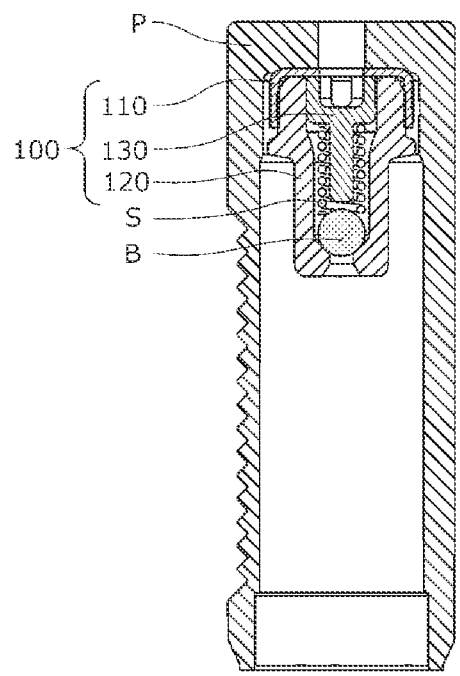
FIG. 1 is a cross-sectional front view of a plunger P in which the check valve unit 100 according to one embodiment of the present invention is mounted.
Figure 2:
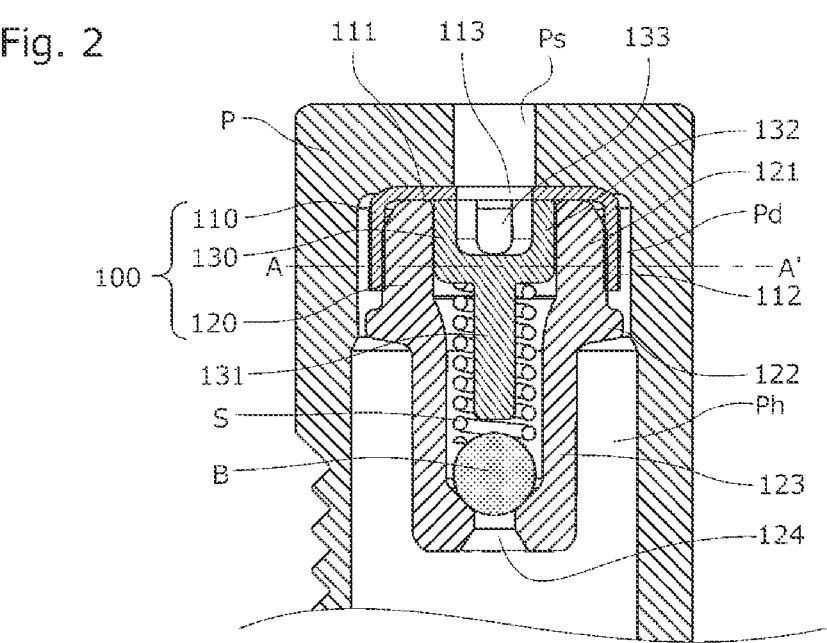
FIG. 2 is an enlarged cross-sectional front view of the plunger P in which the check valve unit 100 according to one embodiment of the present invention is mounted.
Figure 3:
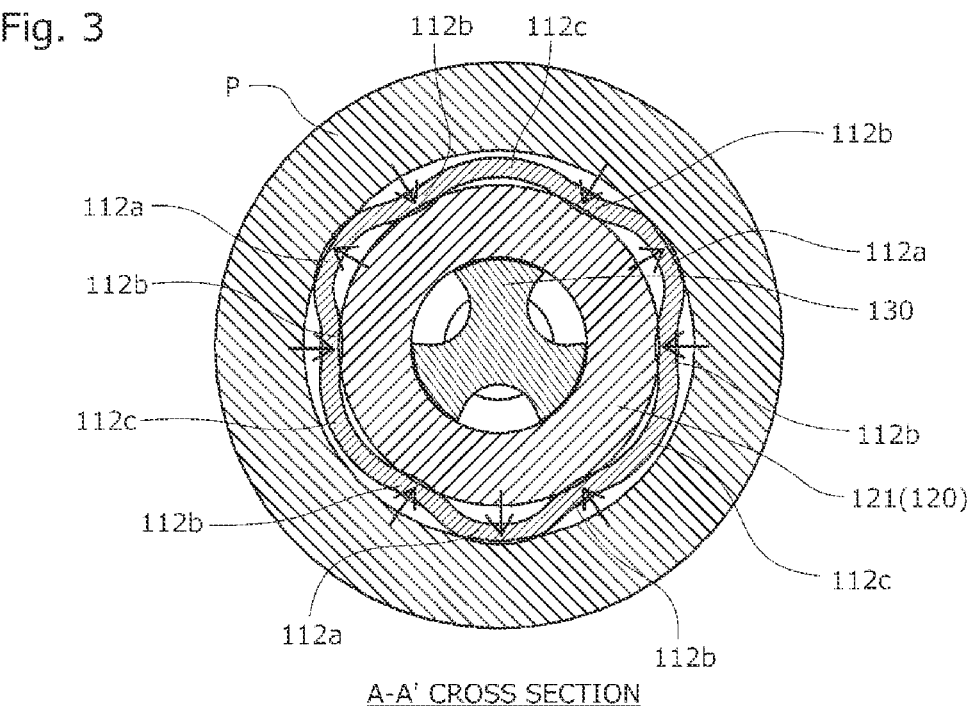
FIG. 3 is a cross-sectional view along A-A' of the plunger P in which the check valve unit 100 according to one embodiment of the present invention is mounted.

The check valve unit 100 is set inside the plunger P of a high-pressure relief valve of a tensioner. As shown in FIG. 1 to FIG. 3, the unit includes: a seat relief 120, which contains a spring S and a valve ball B that are the components of the check valve, and which is inserted into the plunger bore Ph formed in the plunger P; a cap member 110 fitted onto an engaging part 121 of the seat relief 120 at one end thereof in the direction in which the seat relief is inserted into the plunger bore Ph; and a stopper 130 that prevents displacement of the spring S.

At least the cap member 110 and seat relief 120 are made of a metal material.

Figure 4:
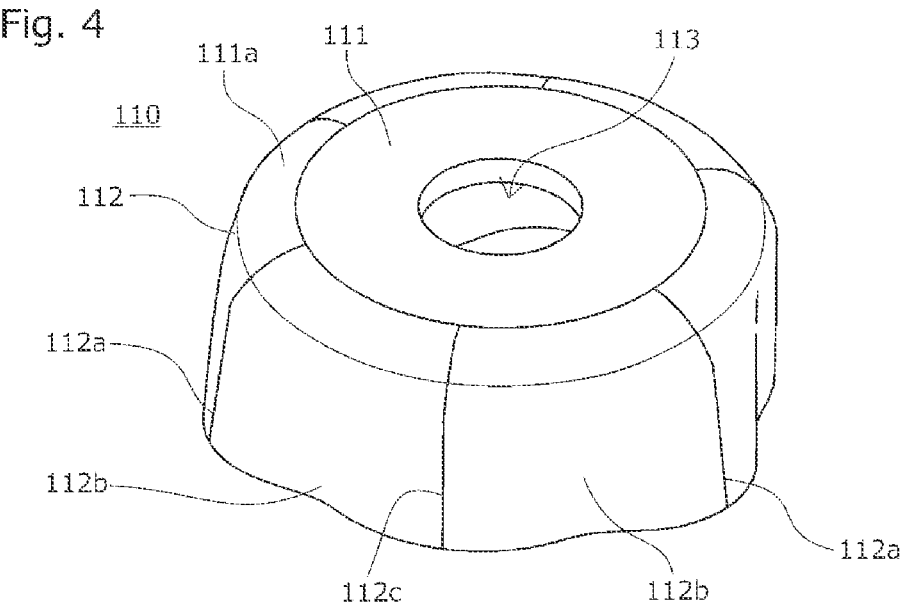
FIG. 4 is a perspective view of a cap member 110 of the check valve unit 100 according to one embodiment of the present invention.
Figure 5:
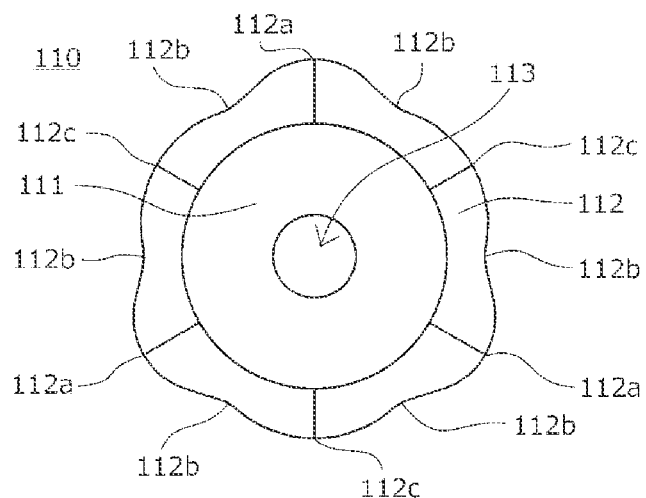
FIG. 5 is a top plan view of the cap member 110 of the check valve unit 100 according to one embodiment of the present invention.
Figure 6:
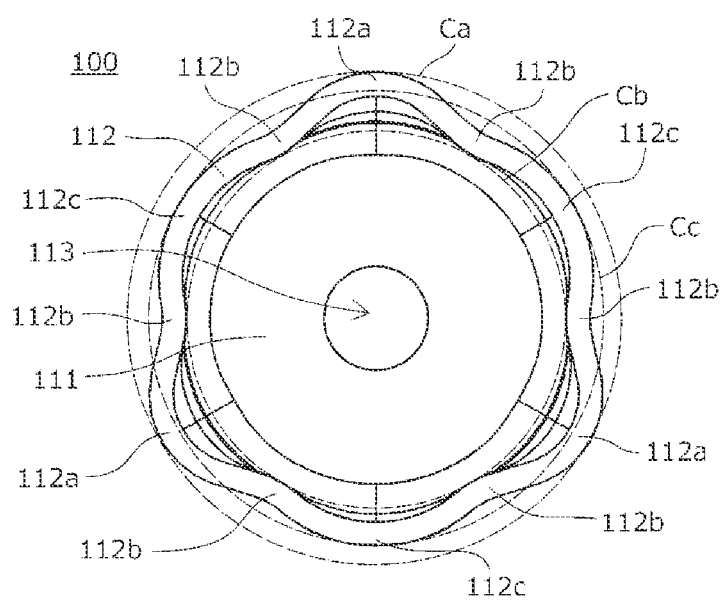
FIG. 6 is a bottom plan view of the cap member 110 of the check valve unit 100 according to one embodiment of the present invention.

The cap member 110 includes a flat cap top 111, an oil flow portion 113 in the form of a through hole in the cap top 111, and a skirt wall 112 that extends down from the cap top 111 via a tapered surface 111a as shown in FIG. 4 to FIG. 6.

The skirt wall 112 is undulated, and has three outwardly raised contact surfaces 112a protruding radially outwards, six inwardly raised contact surfaces 112b protruding radially inwards, and three intermediate raised surfaces 112c that protrude radially outwards. The circumscribed circle Cc of the intermediate raised surfaces 112c has a smaller radius than that of the circumscribed circle Ca of the three outwardly raised contact surfaces 112a.

The radius of the circumscribed circle Ca of the outwardly raised contact surfaces 112a is larger than the radius of the inner circumferential surface of an attachment part Pd of the plunger P and smaller than the radius of the inner circumferential surface of the plunger bore Ph. The radius of the circumscribed circle Cb of the inwardly raised contact surfaces 112b is smaller than the radius of the outer circumferential surface of the engaging part 121 of the seat relief 120.

Figure 7:
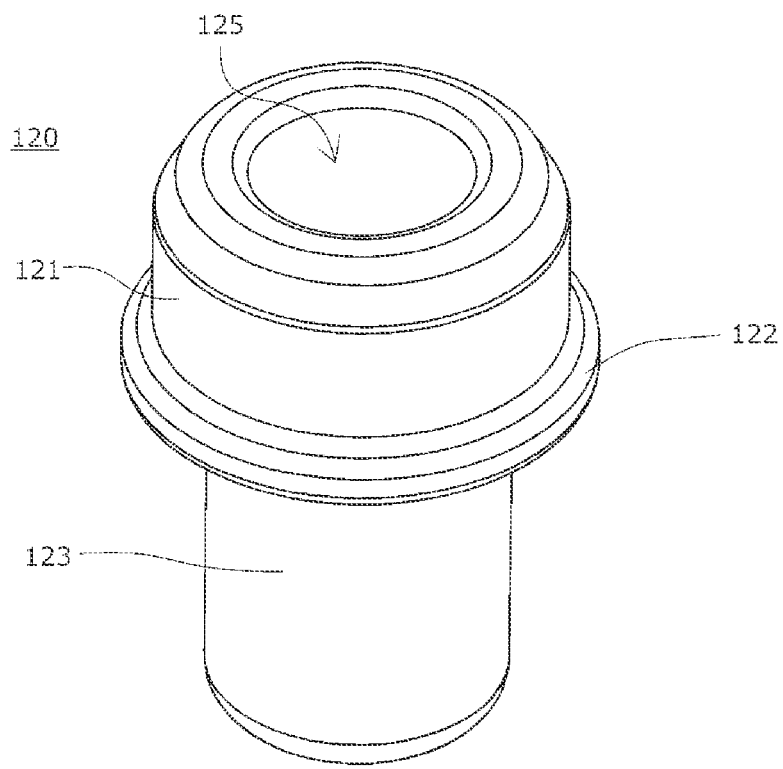
FIG. 7 is a perspective view of a seat relief 120 of the check valve unit 100 according to one embodiment of the present invention.

The seat relief 120 includes the engaging part 121, a ring-like flange part 122 protruded radially outwards from below the engaging part 121, and a valve accommodating part 123 formed below the flange part 122, as shown in FIG. 2 and FIG. 7. A hole extends through from the top of the engaging part 121 to the valve accommodating part 123, terminated with a communication hole 124 at the end of the valve accommodating part 123 and with a mounting hole 125 at the end of the engaging part 121.

The radius of the outer circumferential surface of the flange part 122 is smaller than the radius of the inner circumferential surface of the attachment part Pd of the plunger P. The radius of the inner circumferential surface of the communication hole 124 is smaller than the radius of the valve ball B. The radius of the inner circumferential surface of the mounting hole 125 is larger than the radius of the valve ball B.

Figure 8:
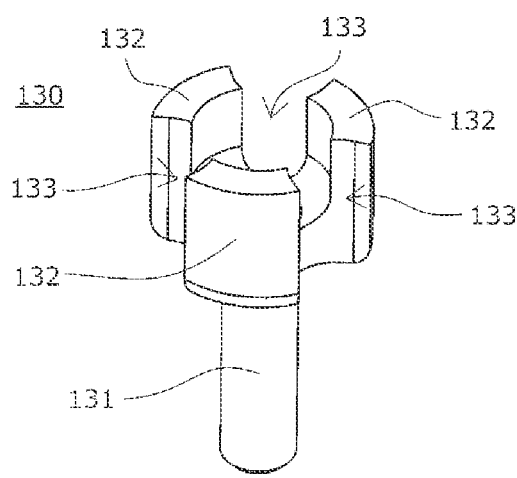
FIG. 8 is a perspective view of a stopper 130 of the check valve unit 100 according to one embodiment of the present invention.

The stopper 130 includes, as shown in FIG. 2 and FIG. 8, a rod-like extending protrusion 131, a wall-like mounting wall portion 132 formed on top of the extending protrusion 131, and oil passage portions 133 extending through the mounting wall portion 132.

The radius of the outer circumferential surface of the mounting wall portion 132 is smaller than the radius of the inner circumferential surface of the mounting hole 125.

Figure 9:
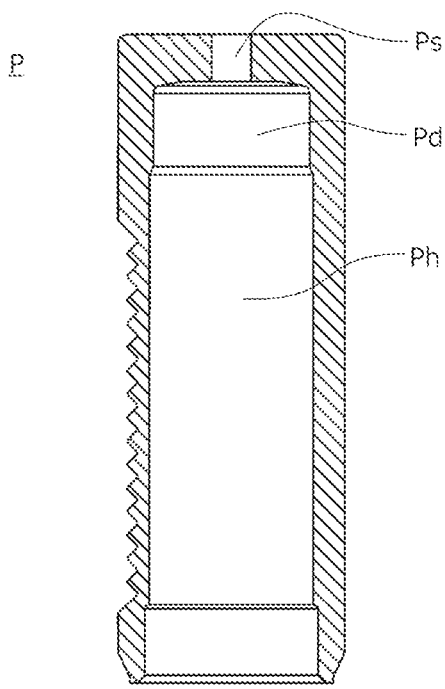
FIG. 9 is a cross-sectional front view of a plunger P in which the check valve unit 100 according to one embodiment of the present invention can be mounted.

The plunger P includes the plunger bore Ph open downwards, the attachment part Pd continuous with the top of the plunger bore Ph, and an outlet relief hole Ps connected to the top of the attachment part Pd and opens to the outside at the top of the plunger P, as shown in FIG. 1, FIG. 2, and FIG. 9.

The radius of the inner circumferential surface of the attachment part Pd is smaller than the radius of the inner circumferential surface of the plunger bore Ph and larger than the radius of the inner circumferential surface of the outlet relief hole Ps.

Next, the process of mounting the check valve unit 100 according to one embodiment of the present invention into the plunger P is described with reference to FIG. 1 to FIG. 3.

First, the valve ball B, then the spring S, are inserted into the seat relief 120 from the mounting hole 125.

Since the valve ball B has a larger radius than that of the inner circumferential surface of the communication hole 124, the valve ball B closes the communication hole 124 as it fits into the seat relief 120.

The stopper 130 is then inserted such that the extending protrusion 131 passes through the spring S.

The radius of the outer circumferential surface of the mounting wall portion 132 is equal to or smaller than the radius of the inner circumferential surface of the mounting hole 125 so that, once inside the seat relief 120, the stopper 130 is prevented from displacement by the mounting hole 125, which in turn prevents displacement of the spring S in which the extending protrusion 131 extends through.

This keeps the valve ball B and spring S in correct positions relative to each other.

Further, the cap member 110 is fitted onto the engaging part 121 such that the upper surface of the engaging part 121 makes tight contact with the lower surface of the cap top 111.

Although the inscribed circle Cb of the six inwardly raised contact surfaces 112b has a smaller radius than that of the outer circumferential surface of the engaging part 121, the skirt wall 112, which is formed in a wavy shape, widens in diameter by elastic deformation and fits onto the engaging part 121.

The check valve unit 100 thus assembled is inserted into the plunger P from the opening of the plunger bore Ph.

Since the circumscribed circle Ca of the three outwardly raised contact surfaces 112a and the outer circumferential surface of the flange part 122 have a smaller radius than that of the inner circumferential surface of the plunger bore Ph, the check valve unit 100 can move without interfering with the plunger bore Ph and reach the attachment part Pd.

The radius of the circumscribed circle Ca of the three outwardly raised contact surfaces 112a is larger than the radius of the inner circumferential surface of the attachment part Pd, and the radius of the outer circumferential surface of the flange part 122 is smaller than the radius of the inner circumferential surface of the attachment part Pd. Therefore, the cap member 110 goes into the attachment part Pd, with its wavy skirt wall 112 undergoing elastic deformation, without the seat relief 120 directly touching the attachment part Pd.

The check valve unit 100 is inserted as far as to the position where the cap top 111 makes tight contact with the far end of the attachment part Pd.

This brings the oil flow portion 113 of the check valve unit 100 in communication with the outlet relief hole Ps of the plunger P, while the space between the attachment part Pd and the cap top 111 is closed, so that the oil inside the plunger P is allowed to flow only when the valve ball B separates from the communication hole 124.

The skirt wall 112, with its outwardly raised contact surfaces 112a being elastically deformed by the attachment part Pd and with its inwardly raised contact surfaces 112b being elastically deformed by the engaging part 121, provides high resilience and firmly fastens the check valve unit 100 inside the attachment part Pd.

Accordingly, there is no need to press-fit the check valve unit 100 so that deformation of the plunger P in which the check valve unit 100 is mounted can be prevented. Thus the cap member 110 and seat relief 120 need not be machined with high precision.

Namely, cost increases in producing the cap member 110 and seat relief 120 can be minimized.

Since the cap member 110 and seat relief 120 are made of a metal material, they are less prone to degradation in comparison to resin components. The cap member 110, in particular, can keep the resilience at a high level for a long time.

There is little likelihood of the cap member 110 and seat relief 120 made of metal being abraded when inserted into the plunger bore Ph.

The intermediate raised surfaces 112c of the skirt wall 112 further enhance the resilient force generated by the elastic deformation of the skirt wall 112 when the check valve unit 100 is inserted into the attachment part Pd, allowing the check valve unit 100 to be fastened to the attachment part Pd even more firmly.

Figure 10:
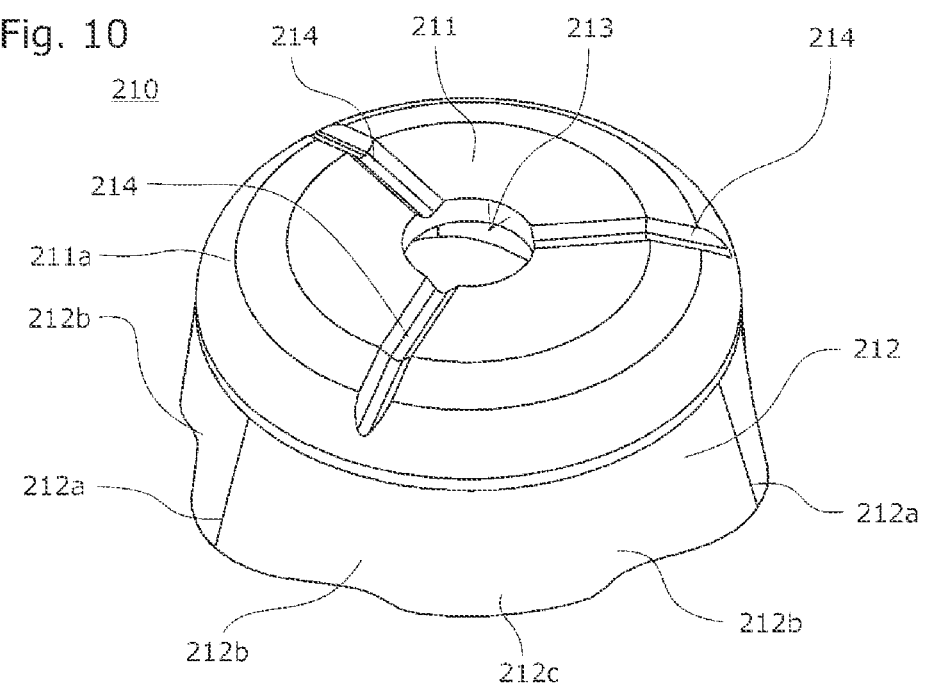
FIG. 10 is a perspective view of a cap member 210 of the check valve unit 100 according to one embodiment of the present invention.

The shapes of the cap member 110, seat relief 120, and stopper 130 are not limited to the example above. For example, a cap member 210 that has a similar shape as the cap member 110 may be formed with cap communication grooves 214 on the upper surface of the cap top 211, as shown in FIG. 10, which communicate the oil flow portion 213 with the skirt wall 212. In this configuration, after the check valve unit 100 has been inserted into the attachment part Pd, the cap communication grooves 214 provide oil flow paths, even though the attachment part Pd is in tight contact with the cap top 211.

Tailoring the size and/or number of the cap communication grooves 214 allows for easy adjustment of the amount of oil flow when the check valve is closed.

Figure 11:
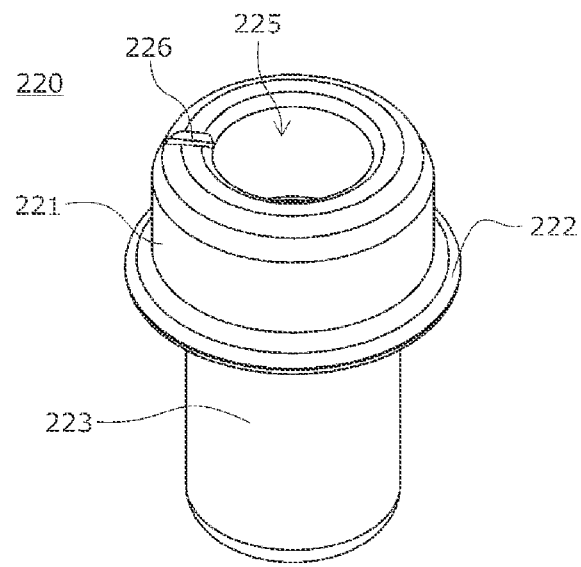
FIG. 11 is a perspective view of a seat relief 220 of the check valve unit 100 according to one embodiment of the present invention.

Alternatively, as shown in FIG. 11, for example, a seat relief 220 that has a similar shape as the seat relief 120 may be formed with a seat relief communication groove 226 on the upper surface of the engaging part 221, which communicates the mounting hole 225 with the outer circumferential surface of the engaging part 221. In this configuration, the seat relief communication groove 226 provides an oil flow path, even though the lower surface of the cap top 111 of the cap member 110 is in tight contact with the upper surface of the engaging part 221 of the seat relief 220.

Tailoring the size and/or number of the seat relief communication groove 226 allows for easy adjustment of the amount of oil flow when the check valve is closed.

Figure 12:
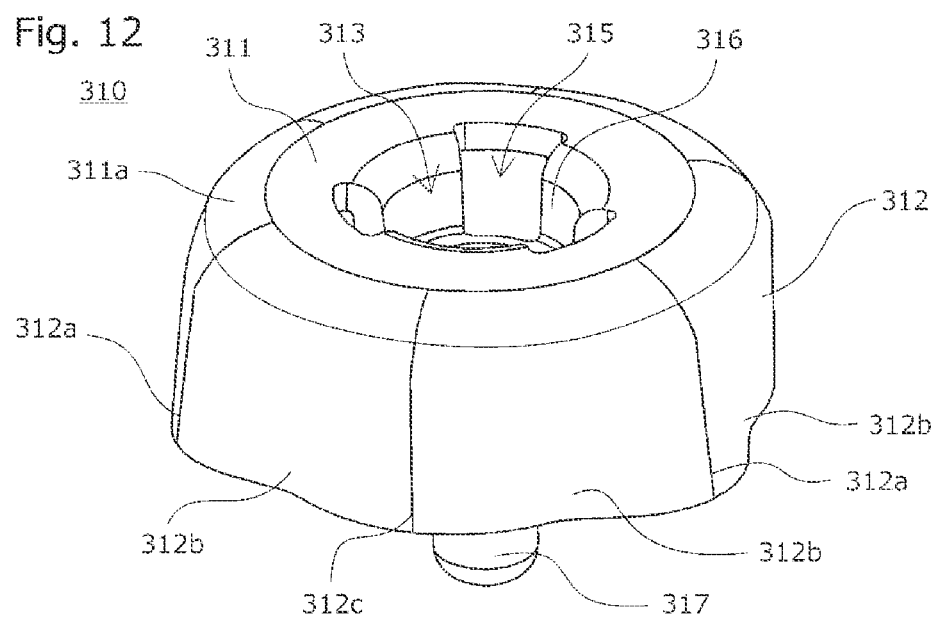
FIG. 12 is a perspective view of a cap member 310 of the check valve unit 100 according to one embodiment of the present invention.
Figure 13:
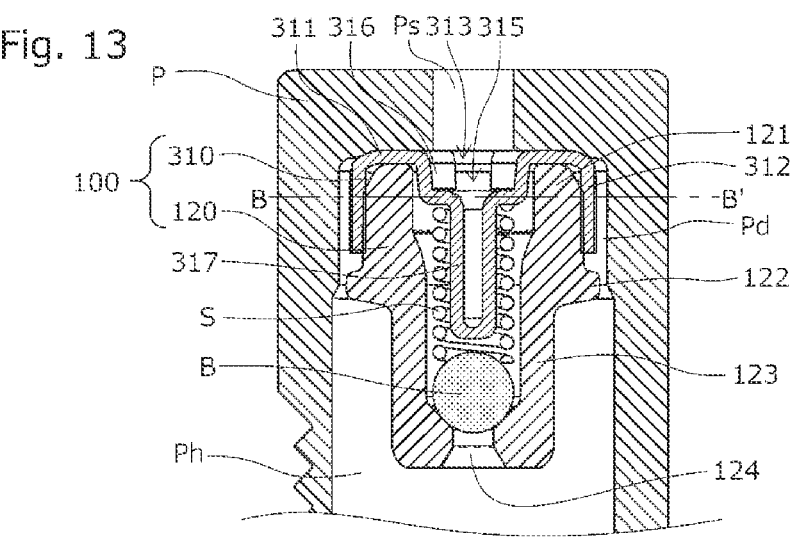
FIG. 13 is a cross-sectional front view of a plunger P in which the check valve unit 100 according to one embodiment of the present invention is mounted.
Figure 14:
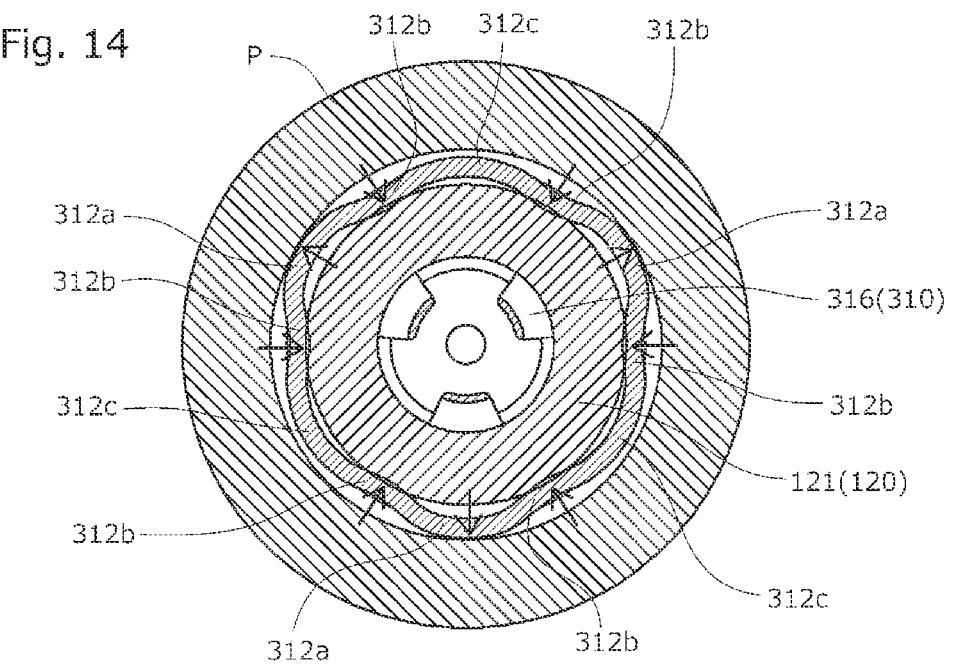
FIG. 14 is a cross-sectional view along B-B' of the plunger P in which the check valve unit 100 according to one embodiment of the present invention is mounted.

Alternatively, as shown in FIG. 12 to FIG. 14, for example, a cap member 310 that has a similar shape as the cap member 110 may include a cap top 311, which is formed with a mounting wall portion 316 extending down from a peripheral edge of the oil flow portion 313, an oil passage portion 315 extending through the mounting wall portion 316, and an extending protrusion 317 extending down from the lower end of the mounting wall portion 316. Such a cap member can prevent displacement of the spring S and make the stopper 130 unnecessary.

The reduction in the number of components makes the production even easier.

While one embodiment of the present invention has been described above in detail, the present invention is not limited to the embodiment described above. Various design changes may be made without departing from the scope of the claims set forth in the claims.

While the extending protrusion is inserted into the spring in the embodiment described above, the arrangement of the spring is not limited to this example. For example, instead of providing the extending protrusion, the inner circumferential surface of the seat relief may be formed with a diameter that is closer to the outside diameter of the spring to prevent displacement of the spring.

While the skirt wall has three outwardly raised contact surfaces, six inwardly raised contact surfaces, and three intermediate raised surfaces in the embodiment described above, the configuration of the skirt wall is not limited to this example. The intermediate raised surfaces may be omitted, for example, and there may be four or more outwardly raised contact surfaces and inwardly raised contact surfaces each.

While the cap communication groove is provided on the upper surface of the cap top in the embodiment described above, the position of the cap communication groove is not limited to this example. The cap communication groove may be provided on the lower surface of the cap top, for example.

In the embodiment described above, oil flow paths are formed by providing communication grooves on the cap top or on the upper surface of the engaging part of the seat relief. The arrangement or shape of the oil flow paths are not limited to this example. An oil flow path may be provided in the form of a hole that extends through the engaging part, for example.

In the embodiment described above, the oil flow portion is provided in the center of the cap top. The number and arrangement of the oil flow portion are not limited to this example. For example, a plurality of oil flow portions may be provided to the cap top.

In the embodiment described above, a taper is provided between the cap top and the skirt wall. The configuration of the cap member is not limited to this example and the taper may be omitted, for example.

What is claimed is:

1. A check valve unit installed in a plunger of a high-pressure relief valve of a tensioner, the check valve unit comprising:
    a seat relief that contains a check valve and that is inserted into a plunger bore formed in the plunger; and
    a cap member fitted onto an engaging part of the seat relief at one end thereof in a direction in which the seat relief is inserted into the plunger bore,
    the plunger including an outlet relief hole in an attachment part of the plunger bore for communication between inside and outside of the plunger,
    the cap member including a flat cap top, an oil flow portion that is a hole extending through the cap top, and a skirt wall that extends down from the cap top,
    the skirt wall including a plurality of outwardly raised contact surfaces protruding radially outwards and a plurality of inwardly raised contact surfaces protruding radially inwards,
    the plurality of outwardly raised contact surfaces having a circumscribed circle with a radius that is larger than an inside radius of the attachment part of the plunger bore before the check valve unit is installed in the plunger,
    the plurality of inwardly raised contact surfaces having an inscribed circle with a radius that is smaller than an outside radius of the engaging part before the cap member is fitted onto the engaging part.

2. The check valve unit according to claim 1, wherein the plurality of outwardly raised contact surfaces and the plurality of inwardly raised contact surfaces are smoothly connected to each other,
    the skirt wall further including a plurality of intermediate raised surfaces protruding radially outwards,
    the plurality of intermediate raised surfaces having a circumscribed circle with a radius that is smaller than the radius of the circumscribed circle of the plurality of outwardly raised contact surfaces.

3. The check valve unit according to claim 1, wherein the cap member is made of a metal material.

4. The check valve unit according to claim 1, wherein the seat relief has an outermost diameter that is smaller than the inside diameter of the attachment part of the plunger bore.

5. The check valve unit according to claim 1, wherein the check valve includes a valve ball and a relief valve spring that biases the valve ball,
    the cap member including a rod-shaped stopper extending down from the cap top,
    the stopper being configured to pass through the relief valve spring.

6. The check valve unit according to claim 1, wherein the cap top is formed with a cap communication groove that communicates an outer circumferential portion of the cap top with the oil flow portion.

7. The check valve unit according to claim 1, wherein the seat relief has an end face that makes tight contact with the cap top, and is formed with a seat relief communication groove that communicates an outer circumferential portion of the end face with the oil flow portion of the cap top in tight contact with the seat relief.

8. A cap member for a check valve unit that is installed in a plunger of a high-pressure relief valve of a tensioner,
the cap member comprising a flat cap top, an oil flow portion that is a hole extending through the cap top, and a skirt wall that extends down from the cap top,
the skirt wall including a plurality of outwardly raised contact surfaces protruding radially outwards, a plurality of inwardly raised contact surfaces protruding radially inwards, and a plurality of connecting surfaces that smoothly connect the plurality of outwardly raised contact surfaces and the plurality of inwardly raised contact surfaces,
the plurality of outwardly raised contact surfaces having a circumscribed circle with a radius that is larger than an inside radius of a plunger bore formed in the plunger,
the plurality of inwardly raised contact surfaces having an inscribed circle with a radius that is smaller than an outside radius of the check valve unit.

* * * * *